US009407135B2

(12) United States Patent
Kinomura et al.

(10) Patent No.: US 9,407,135 B2
(45) Date of Patent: Aug. 2, 2016

(54) POWER CONVERSION APPARATUS, CONTROL DEVICE FOR POWER CONVERSION APPARATUS, AND METHOD FOR CONTROLLING POWER CONVERSION APPARATUS

(71) Applicant: KABUSHIKI KAISHA YASKAWA DENKI, Kitakyushu-shi (JP)

(72) Inventors: Hirofumi Kinomura, Kitakyushu (JP); Takahiro Saeki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 120 days.

(21) Appl. No.: 14/564,090

(22) Filed: Dec. 9, 2014

(65) Prior Publication Data

US 2015/0280549 A1 Oct. 1, 2015

(30) Foreign Application Priority Data

Mar. 26, 2014 (JP) .................................. 2014-063982

(51) Int. Cl.
*H02M 5/27* (2006.01)
*H02M 1/42* (2007.01)
(Continued)

(52) U.S. Cl.
CPC ............ *H02M 1/4216* (2013.01); *H02M 1/126* (2013.01); *H02M 5/273* (2013.01); *H02M 5/297* (2013.01); *H02M 2001/0025* (2013.01); *H02M 2005/2932* (2013.01); *Y02B 70/126* (2013.01)

(58) Field of Classification Search
CPC ......... H02M 5/40; H02M 5/42; H02M 5/453; H02M 7/7575; H02M 5/458; H02M 5/4585; H02M 5/4505; H02M 5/451; H02M 5/452; H02M 5/447; H02M 5/456; H02M 5/27; H02M 5/271; H02M 5/272; H02M 5/273; H02M 5/297; H02H 7/261; H02H 7/268; H02J 3/36; H03B 19/00; H03B 19/03; H03B 19/14; H01F 38/04
See application file for complete search history.

(56) References Cited

U.S. PATENT DOCUMENTS 6,154,379 A * 11/2000 Okita ...................... H02M 7/48
363/40
2001/0048604 A1* 12/2001 Oka ....................... H02M 7/219
363/44
(Continued)

FOREIGN PATENT DOCUMENTS

WO WO 2013/080744 6/2013

OTHER PUBLICATIONS

Extended European Search Report for corresponding EP Application No. 14196913.9-1809, Aug. 5, 2015.
(Continued)

*Primary Examiner* — Jeffrey Gblende
(74) *Attorney, Agent, or Firm* — Mori & Ward, LLP

(57) ABSTRACT

A power conversion apparatus includes a power converter, an LC filter, and a controller. The power converter is disposed between an AC power source and a load. The LC filter is disposed between the AC power source and the power converter. The controller controls the power converter to perform power conversion control between the AC power source and the load. The controller includes a command generator, an oscillation component acquirer, a regulator, and an actuator. The command generator generates an input current command including a command of an input current of the power converter. The oscillation component acquirer acquires an oscillation component of a current flowing through a capacitor of the LC filter. The regulator regulates the input current command based on the oscillation component acquired by the oscillation component acquirer. The actuator controls the power converter based on the input current command regulated by the regulator.

12 Claims, 12 Drawing Sheets

(51) Int. Cl.
*H02M 1/12* (2006.01)
*H02M 5/297* (2006.01)
*H02M 1/00* (2006.01)
*H02M 5/293* (2006.01)

(56) References Cited

U.S. PATENT DOCUMENTS

| | | | | |
|---|---|---|---|---|
| 2007/0159121 | A1* | 7/2007 | Maikawa | H02P 21/00 |
| | | | | 318/140 |
| 2007/0217243 | A1* | 9/2007 | Yamamoto | H02M 5/297 |
| | | | | 363/160 |
| 2009/0237964 | A1* | 9/2009 | Serpa | H02M 1/12 |
| | | | | 363/40 |
| 2014/0268970 | A1 | 9/2014 | Tanaka et al. | |

OTHER PUBLICATIONS

Haruna et al., "Modeling Design for a Matrix Converter with a Generator as Input", Control and Modeling for Power Electronics, 2008. COMPEL 2008. 11th Workshop on, IEEE, Piscataway, NJ, USA, Aug. 17, 2008, pp. 1-7, XP031328391, ISBN: 978-1-4244-2550-1.

Takahashi et al., "Damping Control Combined to Output Stage for a Multi-Modular Matrix Converter", Applied Power Electronics Conference and Exposition (APEC), 2013 Twenty-Eighth Annual IEEE, IEEE, Mar. 17, 2013, pp. 1226-1233, XP032410491, DOI: 10.1109/APEC.2013.6520455 ISBN: 978-1-4673-4354-1.

Itoh et al., "A High Energy Saving Interface System Using a Matrix Converter between a Power Grid and an Engine Generator for Bio Diesel Fuel", 2011 IEEE Trondheim Powertech : Trondheim, Norway, Jun. 19-23, 2011, IEEE, Piscataway, NJ, Jun. 19, 2011, pp. 1-7, XP032263454, DOI: 10.1109/PTC.2011.6019230 ISBN: 978-1-4244-8419-5.

Rivera et al., "Predictive Current Control With Input Filter Resonance Mitigation for a Direct Matrix Converter", IEEE Transactions on Power Electronics, Institute of Electrical and Electronics Engineers, USA, Oct. 1, 2011, pp. 2794-2803, vol. 26, No. 10, XP011360550, ISSN: 0885-8993, DOI: 10.1109/TPEL.2011.2121920.

Wiseman et al., "Active Damping Control of a High-Power PWM Current-Source Rectifier for Line-Current THD Reduction", IEEE Transactions on Industrial Electronics, IEEE Service Center, Piscataway, NJ, USA, Jun. 1, 2005, pp. 758-764, vol. 52, No. 3, XP011133054, ISSN: 0278-0046, DOI: 10.1109/TIE.2005.843939.

* cited by examiner

POWER CONVERSION APPARATUS, CONTROL DEVICE FOR POWER CONVERSION APPARATUS, AND METHOD FOR CONTROLLING POWER CONVERSION APPARATUS

CROSS-REFERENCE TO RELATED APPLICATIONS

The present application claims priority under 35 U.S.C. §119 to Japanese Patent Application No. 2014-063982, filed Mar. 26, 2014. The contents of this application are incorporated herein by reference in their entirety.

BACKGROUND

1. Field of the Invention

The embodiments disclosed herein relate to a power conversion apparatus, a control device for a power conversion apparatus, and a method for controlling a power conversion apparatus.

2. Discussion of the Background

Examples of conventional power conversion apparatuses include a matrix converter to directly convert power of an AC (Alternating-Current) power source to AC power with a desired frequency and voltage, and a regeneration converter to perform power regeneration to an AC power source.

Such a power conversion apparatus includes switching elements such as semiconductor switches. By switching between the switching elements, power conversion is performed. The switching may cause harmonic noise. In view of this, some power conversion apparatuses use a filter on the input side of the power conversion apparatuses.

Providing a filter on the input side may cause a resonance between capacitors and reactors constituting the filter, resulting in a distortion in input current. WO 2013/080744 discloses a method for suppressing such distortion by extracting an oscillation component from output current and regulating an output current command based on the oscillation component.

SUMMARY

According to one aspect of the present disclosure, a power conversion apparatus includes a power converter, an LC filter, and a controller. The power converter is disposed between an AC power source and a load. The LC filter is disposed between the AC power source and the power converter. The controller is configured to control the power converter to perform power conversion control between the AC power source and the load. The controller includes a command generator, an oscillation component acquirer, a regulator, and an actuator. The command generator is configured to generate an input current command including a command of an input current of the power converter. The oscillation component acquirer is configured to acquire an oscillation component of a current flowing through a capacitor of the LC filter. The regulator is configured to regulate the input current command based on the oscillation component acquired by the oscillation component acquirer. The actuator is configured to control the power converter based on the input current command regulated by the regulator.

According to another aspect of the present disclosure, a control device for a power conversion apparatus includes an oscillation component acquirer, a command generator, a regulator, and an actuator. The oscillation component acquirer is configured to acquire an oscillation component of a current flowing through a capacitor of an LC filter disposed between a power converter and an AC power source. The power converter is configured to perform power conversion between the AC power source and a load. The command generator is configured to generate an input current command including a command of an input current of the power converter. The regulator is configured to regulate the input current command based on the oscillation component acquired by the oscillation component acquirer. The actuator is configured to control the power converter based on the input current command regulated by the regulator.

According to the other aspect of the present disclosure, a method for controlling a power conversion apparatus includes acquiring an oscillation component of a current flowing through a capacitor of an LC filter disposed between a power converter and an AC power source. The power converter is configured to perform power conversion between the AC power source and a load. An input current command including a command of an input current of the power converter is generated. The input current command is regulated based on the acquired oscillation component. The power converter is controlled based on the regulated input current command.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A power conversion apparatus, a control device for the power conversion apparatus, and a method for controlling the power conversion apparatus according to embodiments will be described in detail below with reference to the accompanying drawings. It should be noted that the embodiments should not be construed in a limiting sense.

1. First Embodiment

1.1. Exemplary Configuration of Power Conversion Apparatus

Figure 1:
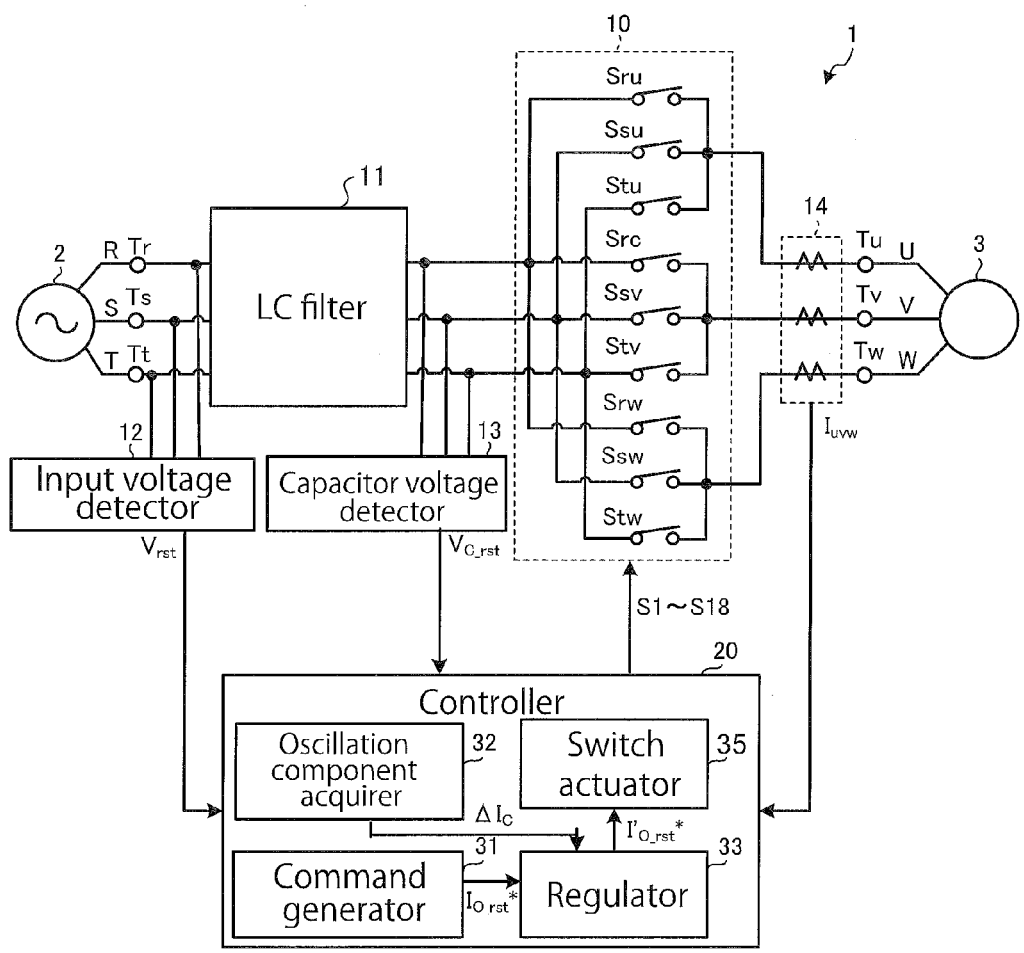
FIG. 1 is a diagram illustrating an exemplary configuration of a power conversion apparatus according to a first embodiment.

FIG. 1 is a diagram illustrating an exemplary configuration of a power conversion apparatus according to a first embodiment. As illustrated in FIG. 1, the power conversion apparatus 1 according to the first embodiment is a matrix converter disposed between a three phase AC power source 2 (hereinafter simply referred to as AC power source 2) and a three phase AC load 3 (hereinafter simply referred to as load 3).

An example of the AC power source 2 is an electric power system. Examples of the load 3 include, but are not limited to, an AC motor and an AC generator. In the following description, the R phase, the S phase, and the T phase of the AC power source 2 will be referred to as input phases. The U phase, the V phase, and the W phase of the load 3 will be referred to as output phases.

The power conversion apparatus 1 includes input terminals Tr, Ts, and Tt, output terminals Tu, Tv, and Tw, a power converter 10, an LC filter 11, an input voltage detector 12, a capacitor voltage detector 13, an output current detector 14, and a controller 20.

The power converter 10 includes a plurality of bidirectional switches Sru, Ssu, Stu, Srv, Ssv, Stv, Srw, Ssw, and Stw (hereinafter occasionally collectively referred to as bidirectional switch Sw), which are respectively coupled between the phases of the AC power source 2 and the phases of the load 3.

The bidirectional switches Sru, Ssu, Stu respectively couple the R phase, the S phase, and the T phase of the AC power source 2 to the U phase of the load 3. The bidirectional switches Srv, Ssv, and Stv respectively couple the R phase, the S phase, and the T phase of the AC power source 2 to the V phase of the load 3. The bidirectional switches Srw, Ssw, and Stw respectively couple the R phase, the S phase, and the T phase of the AC power source 2 to the W phase of the load 3.

Figure 2:
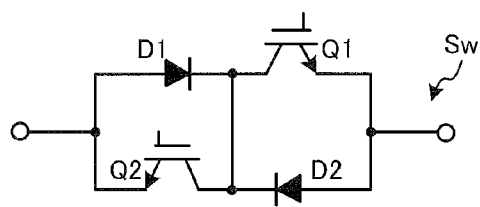
FIG. 2 is a diagram illustrating an exemplary configuration of a bidirectional switch illustrated in FIG. 1.

FIG. 2 is a diagram illustrating an exemplary configuration of the bidirectional switch Sw. As illustrated in FIG. 2, the bidirectional switch Sw includes two series connection circuits. One series connection circuit includes a switching element Q1 and a diode D1. The other series connection circuit includes a switching element Q2 and a diode D2. These series connection circuits are anti-parallelly coupled to each other.

It is noted that the bidirectional switch Sw will not be limited to the configuration illustrated in FIG. 2 insofar as the bidirectional switch Sw includes a plurality of switching elements to control the conduction direction. While in FIG. 2 the cathode of the diode D1 and the cathode of the diode D2 are coupled to each other, another possible example is that the cathode of the diode D1 and the cathode of the diode D2 are not coupled to each other.

Examples of the switching elements Q1 and Q2 include, but are not limited to, semiconductor switching elements such as metal-oxide-semiconductor field-effect transistor (MOSFET) and insulated gate bipolar transistor (IGBT). Other examples of the switching elements Q1 and Q2 include wide bandgap semiconductors containing gallium nitride (GaN) or silicon carbide (SiC). When the switching elements Q1 and Q2 are reverse blocking IGBTs, the diode D1 or D2 may not be necessary.

Gate signals S1 to S9 are input into the gates of the switching elements Q1 of the bidirectional switches Sru, Ssu, Stu, Srv, Ssv, Stv, Srw, Ssw, and Stw. Gate signals S10 to S18 are input into the gates of the switching elements Q2 of the bidirectional switches Sru, Ssu, Stu, Srv, Ssv, Stv, Srw, Ssw, and Stw.

Referring back to FIG. 1, the power conversion apparatus 1 will be further described. The LC filter 11 is disposed between the power converter 10 and the R phase, the S phase, and the T phase of the AC power source 2 so as to remove switching noise caused by switching of the bidirectional switch Sw, which constitutes the power converter 10.

Figure 3:
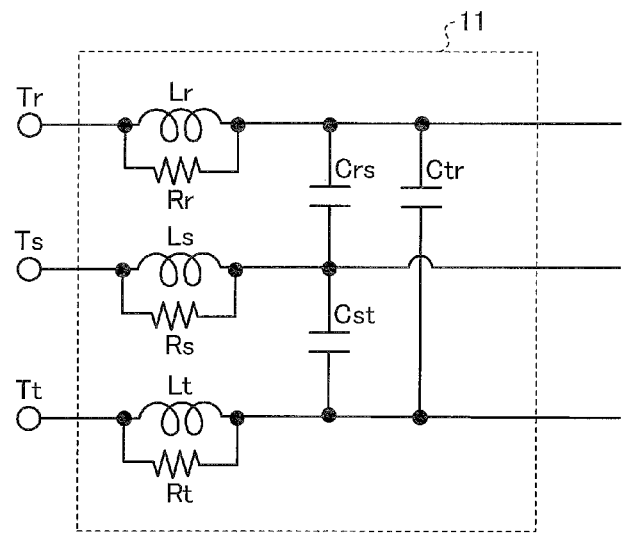
FIG. 3 is a diagram illustrating an exemplary configuration of an LC filter.

FIG. 3 is a diagram illustrating an exemplary configuration of the LC filter 11. As illustrated in FIG. 3, the LC filter 11 includes three reactors Lr, Ls, and Lt, three capacitors Crs, Cst, and Ctr, and three resistors Rr, Rs, and Rt. The reactors Lr, Ls, and Lt are respectively coupled between the R phase, the S phase, and the T phase of the AC power source 2 and the power converter 10.

The reactors Lr, Ls, and Lt are respectively coupled in parallel with the resistors Rr, Rs, and Rt. The resistors Rr, Rs, and Rt are damping resistors to suppress resonance of the LC filter 11. It should be noted that the LC filter will not be limited to the configuration illustrated in FIG. 3. For example, the LC filter 11 may have a configuration without the resistors Rr, Rs, and Rt.

The capacitors Crs, Cst, and Ctr are coupled between two mutually different input phases. Specifically, the capacitor Crs is coupled between the R phase and the S phase. The capacitor Cst is coupled between the S phase and the T phase. The capacitor Ctr is coupled between the R phase and the T phase.

Referring back to FIG. 1, the power conversion apparatus 1 will be further described. The input voltage detector 12 detects momentary voltages $V_r$, $V_s$, and $V_t$ (hereinafter referred to as input phase voltages $V_r$, $V_s$, and $V_t$) respectively of the R phase, the S phase, and the T phase of the AC power source 2 when the momentary voltages $V_r$, $V_s$, and $V_t$ are input from the AC power source 2 to the power conversion apparatus 1. In the following description, the input phase voltages $V_r$, $V_s$, and $V_t$ will be occasionally referred to as input voltage $V_{rst}$.

The capacitor voltage detector 13 detects momentary voltages $V_{c\_rs}$, $V_{c\_st}$, and $V_{c\_tr}$ respectively across the capacitors Crs, Cst, and Ctr. In the following description, the capacitor voltages $V_{c\_rs}$, $V_{c\_st}$, and $V_{c\_tr}$ will be occasionally referred to as capacitor voltage $V_{c\_rst}$.

The output current detector 14 detects momentary currents $I_u$, $I_v$, and $I_w$ respectively flowing between the power converter 10 and the U phase, the V phase, and the W phase of the load 3 (hereinafter referred to as output phase currents $I_u$, $I_v$, and $I_w$). It should be noted that the output current detector 14 detects the currents using, for example, a Hall element, which is a magnetoelectric conversion device. In the following description, the output phase currents $I_u$, $I_v$, and $I_w$ will be occasionally referred to as output current $I_{uvw}$.

The controller 20 controls the power converter 10 to perform power conversion control between the AC power source 2 and the load 3. The controller 20 performs in power running mode and regenerative operation mode.

In power running mode, the controller 20 controls the power converter 10 to convert three phase AC power supplied from the AC power source 2 through the input terminals Tr, Ts, and Tt into three phase AC power with a desired voltage and a desired frequency, and to output the converted three phase AC power to the load 3 through the output terminals Tu, Tv, and Tw.

In regenerative operation mode, the controller 20 controls the power converter 10 to convert regeneration power supplied from the load 3 through the output terminals Tu, Tv, and Tw into three phase AC power with the frequency and voltage of the AC power source 2, and to supply the converted three phase AC power to the AC power source 2 through the input terminals Tr, Ts, and Tt.

The controller 20 includes a command generator 31, an oscillation component acquirer 32, a regulator 33, and a switch actuator 35 (which is an example of the actuator).

The command generator 31 generates an input current command $I_{O\_rst}{}^*$, which is a command of an input current $I_{O\_rst}$ of the power converter 10. The input current command $I_{O\_rst}{}^*$ includes commands $I_{O\_r}{}^*$, $I_{O\_s}{}^*$, and $I_{O\_t}{}^*$ of currents $I_{O\_r}$, $I_{O\_s}$, and $I_{O\_t}$ respectively of the R phase, the S phase, and the T phase of the AC power source 2. The currents $I_{O\_r}$, $I_{O\_s}$, and $I_{O\_t}$ are input into the power converter 10.

Based on the capacitor voltage $V_{c\_rst}$, the oscillation component acquirer 32 acquires an oscillation component $\Delta I_C$ of the current flowing through the capacitors Crs, Cst, and Ctr of the LC filter 11 (the current will be hereinafter occasionally referred to as capacitor current $I_{C\_rst}$). The oscillation component $\Delta I_C$ includes a resonance frequency component of the LC filter 11.

Based on the oscillation component $\Delta I_C$ acquired by the oscillation component acquirer 32, the regulator 33 regulates the input current command $I_{O\_rst}{}^*$ to generate an input current command $I'_{O\_rst}{}^*$. Based on the input current command $I'_{O\_rst}{}^*$ output from the regulator 33, the switch actuator 35 controls the bidirectional switch Sw, which constitutes the power converter 10. The input current command $I'_{O\_rst}{}^*$ includes commands $I'_{O\_r}{}^*$, $I'_{O\_s}{}^*$, and $I'_{O\_t}{}^*$. The commands $I'_{O\_r}{}^*$, $I'_{O\_s}{}^*$, and $I'_{O\_t}{}^*$ are respectively of the currents that are respectively of the R phase, the S phase, and the T phase of the AC power source 2 and that are input into the power converter 10.

Thus, the controller 20 regulates the input current command $I_{O\_rst}{}^*$ based on the oscillation component $\Delta I_C$ of the current flowing through the capacitors Crs, Cst, and Ctr, and controls the power converter 10 based on the regulated input current command $I'_{O\_rst}{}^*$ so as to perform resonance suppression.

1.2. Resonance Suppression

Figure 4:
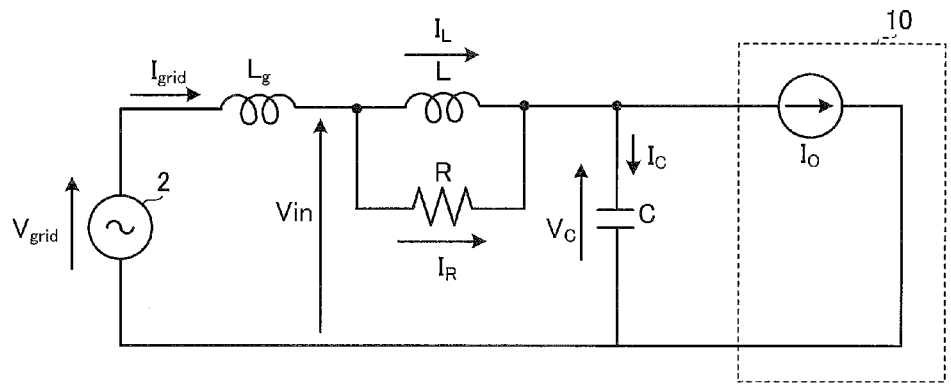
FIG. 4 is a diagram illustrating an input-output relationship in one phase of the LC filter.

Resonance suppression will now be described with reference to the accompanying drawings. FIG. 4 is a diagram illustrating an input-output relationship in one phase of the LC filter 11. The following symbols are used in FIG. 4:

$V_{grid}$: Output voltage of the AC power source 2

$I_{grid}$: Output current of the AC power source 2

$L_g$: Inductance of wiring between the AC power source 2 and the power conversion apparatus 1

L: Inductance of the reactors Lr, Ls, and Lt

R: Resistance value of the resistors Rr, Rs, and Rt

C: Capacitance of the capacitors Crs, Cst, and Ctr $I_L$: Current flowing through the reactors Lr, Ls, and Lt $I_R$: Current flowing through the resistors Rr, Rs, and Rt $I_C$: Current flowing through the capacitors Crs, Cst, and Ctr (capacitor current)

$V_C$: Voltage across the capacitors Crs, Cst, and Ctr (capacitor voltage)

$I_O$: Current flowing from the AC power source 2 to the power converter 10 through the LC filter 11

As seen from the circuit illustrated in FIG. 4, the following Formulae (1) to (5) hold with respect to the R phase, S phase, and T phase. As used in these Formulae, the subscript "rst" indicates a matrix with three rows and one column in which the R phase, S phase, and T phase elements are arranged in three rows.

$$\frac{d}{dt}V_{C\_rst} = \frac{1}{C}I_{C\_rst} \tag{1}$$

$$I_{grid\_rst} = I_{C\_rst} + I_{O\_rst} \tag{2}$$

$$I_{grid\_rst} = I_{R\_rst} + I_{L\_rst} \tag{3}$$

$$V_{grid\_rst} = L_g\frac{d}{dt}I_{grid\_rst} + V_{L\_rst} + V_{C\_rst} \tag{4}$$

$$V_{L\_rst} = RI_{R\_rst} = L\frac{d}{dt}I_{L\_rst} \tag{5}$$

From Formulae (3) and (5), a state equation representing the parallel connection portions between the reactors Lr, Ls, and Lt and the resistors Rr, Rs, and Rt can be represented by the following Formula (6).

$$V_{L\_rst} = L\frac{d}{dt}I_{L\_rst} = L\frac{d}{dt}\left(I_{grid\_rst} - \frac{1}{R}V_{L\_rst}\right) \tag{6}$$

Formula (6) can be represented by the following Formula (7).

$$\frac{d}{dt}V_{L\_rst} - R\frac{d}{dt}I_{grid\_rst} = -\frac{R}{L}V_{L\_rst} \tag{7}$$

Next, from Formulae (1) and (2), a state equation representing the capacitors Crs, Cst, and Ctr can be represented by the following Formula (8).

$$\frac{d}{dt}V_{C\_rst} = \frac{1}{C}I_{grid\_rst} - \frac{1}{C}I_{O\_rst} \tag{8}$$

From Formula (4), a state equation representing the AC power source 2 can be represented by the following Formula (9).

$$\frac{d}{dt}I_{grid\_rst} = \frac{1}{L_g}V_{grid\_rst} - \frac{1}{L_g}V_{L\_rst} - \frac{1}{L_g}V_{C\_rst} \qquad (9)$$

From Formulae (7) to (9), a three-phase state equation can be represented by the following Formula (10) in the form of a determinant. In Formula (10), $O_{33}$ indicates a zero matrix in a third-order square matrix, and $I_{33}$ indicates a third-order unit matrix.

$$\begin{bmatrix} I_{33} & O_{33} & O_{33} \\ -RI_{33} & I_{33} & O_{33} \\ O_{33} & O_{33} & I_{33} \end{bmatrix} \frac{d}{dt}\begin{bmatrix} I_{grid\_rst} \\ V_{L\_rst} \\ V_{C\_rst} \end{bmatrix} = \begin{bmatrix} O_{33} & -L_g^{-1}I_{33} & -L_g^{-1}I_{33} \\ O_{33} & -RL^{-1}I_{33} & O_{33} \\ C^{-1}I_{33} & O_{33} & O_{33} \end{bmatrix} \qquad (10)$$

$$\begin{bmatrix} I_{grid\_rst} \\ V_{L\_rst} \\ V_{C\_rst} \end{bmatrix} + \begin{bmatrix} L_g^{-1}I_{33} & O_{33} \\ O_{33} & O_{33} \\ O_{33} & -C^{-1}I_{33} \end{bmatrix} \begin{bmatrix} V_{grid\_rst} \\ I_{O\_rst} \end{bmatrix}$$

Here, assume that the following Formula (11) holds.

$$\begin{bmatrix} I_{33} & O_{33} & O_{33} \\ -RI_{33} & I_{33} & O_{33} \\ O_{33} & O_{33} & I_{33} \end{bmatrix}^{-1} = \begin{bmatrix} I_{33} & O_{33} & O_{33} \\ RI_{33} & I_{33} & O_{33} \\ O_{33} & O_{33} & I_{33} \end{bmatrix} \qquad (11)$$

In this case, from Formulae (10) and (11), a three-phase state equation can be represented by the following Formula (12).

$$\frac{d}{dt}\begin{bmatrix} I_{grid\_rst} \\ V_{L\_rst} \\ V_{C\_rst} \end{bmatrix} = \begin{bmatrix} I_{33} & O_{33} & O_{33} \\ RI_{33} & I_{33} & O_{33} \\ O_{33} & O_{33} & I_{33} \end{bmatrix} \begin{bmatrix} O_{33} & -L_g^{-1}I_{33} & -L_g^{-1}I_{33} \\ O_{33} & -RL^{-1}I_{33} & O_{33} \\ C^{-1}I_{33} & O_{33} & O_{33} \end{bmatrix} \qquad (12)$$

$$\begin{bmatrix} I_{grid\_rst} \\ V_{L\_rst} \\ V_{C\_rst} \end{bmatrix} + \begin{bmatrix} I_{33} & O_{33} & O_{33} \\ RI_{33} & I_{33} & O_{33} \\ O_{33} & O_{33} & I_{33} \end{bmatrix} \begin{bmatrix} L_g^{-1}I_{33} & O_{33} \\ O_{33} & O_{33} \\ O_{33} & -C^{-1}I_{33} \end{bmatrix} \begin{bmatrix} V_{grid\_rst} \\ I_{O\_rst} \end{bmatrix}$$

Thus, the three-phase state equation can be represented by the following Formula (13).

$$\frac{d}{dt}\begin{bmatrix} I_{grid\_rst} \\ V_{L\_rst} \\ V_{C\_rst} \end{bmatrix} = \begin{bmatrix} O_{33} & -L_g^{-1}I_{33} & -L_g^{-1}I_{33} \\ O_{33} & -R(L^{-1}+L_g^{-1})I_{33} & -RL_g^{-1}I_{33} \\ C^{-1}I_{33} & O_{33} & O_{33} \end{bmatrix} \qquad (13)$$

$$\begin{bmatrix} I_{grid\_rst} \\ V_{L\_rst} \\ V_{C\_rst} \end{bmatrix} + \begin{bmatrix} L_g^{-1}I_{33} & O_{33} \\ RL_g^{-1}I_{33} & O_{33} \\ O_{33} & -C^{-1}I_{33} \end{bmatrix} \begin{bmatrix} V_{grid\_rst} \\ I_{O\_rst} \end{bmatrix}$$

A characteristic equation of the state equation represented by Formula (13) can be represented by the following Formula (14).

$$|sI_{33}-A|=0 \qquad (14)$$

In Formula (14), a matrix A can be represented by the following Formula (15).

$$A = \begin{bmatrix} O_{33} & -L_g^{-1}I_{33} & -L_g^{-1}I_{33} \\ O_{33} & -R(L^{-1}+L_g^{-1})I_{33} & -RL_g^{-1}I_{33} \\ C^{-1}I_{33} & O_{33} & O_{33} \end{bmatrix} \qquad (15)$$

Thus, Formula (14) can be represented by the following Formula (16).

$$s^3I_{33}+s^2R(L^{-1}+L_g^{-1})I_{33}+sL_g^{-1}C^{-1}I_{33}+RL^{-1}L_g^{-1}C^{-1}I_{33}=0 \qquad (16)$$

Figure 5A:
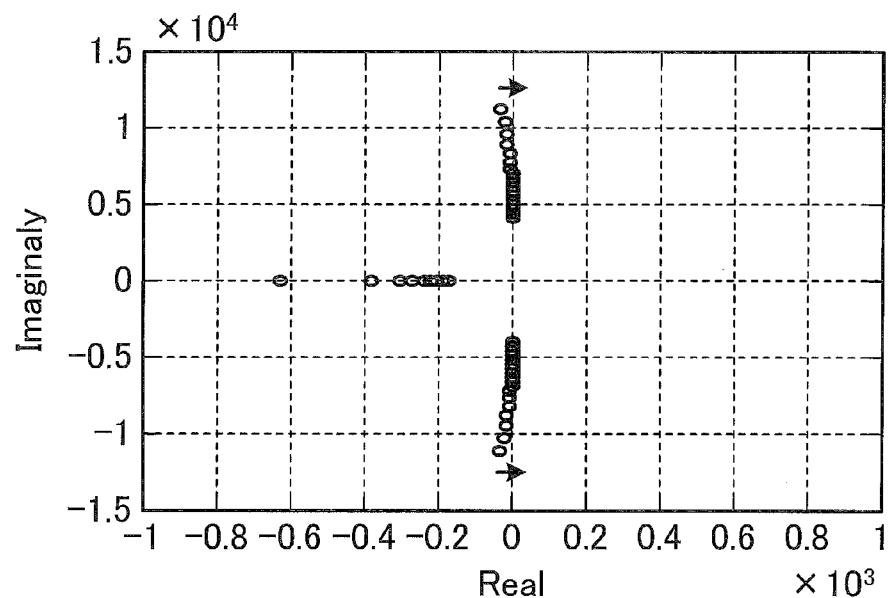
FIG. 5A is a graph illustrating how pole changes relative to increases in impedance on the power source side.
Figure 5B:
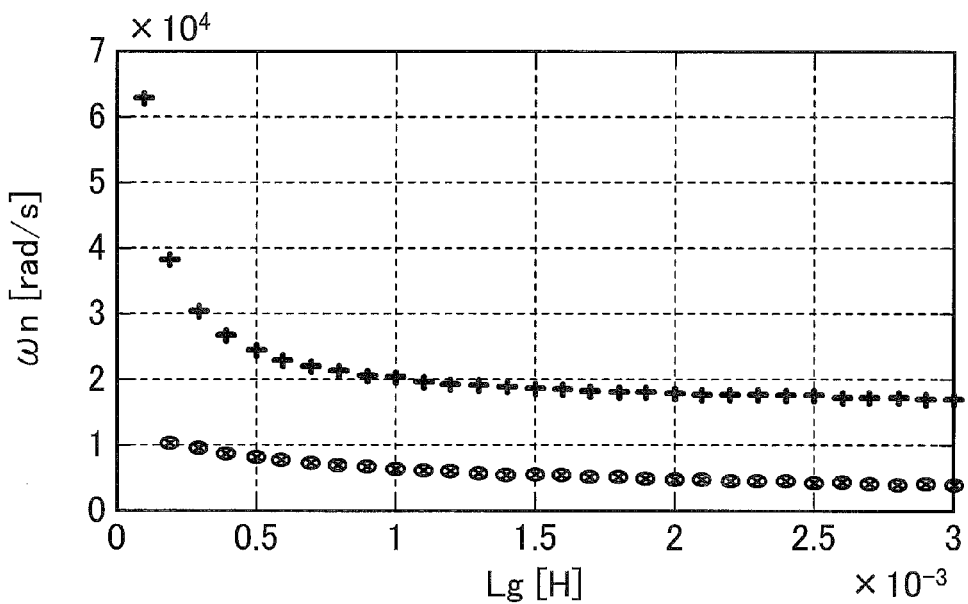
FIG. 5B is a graph illustrating how resonance angular velocity changes relative to increases in the impedance on the power source side.
Figure 5C:
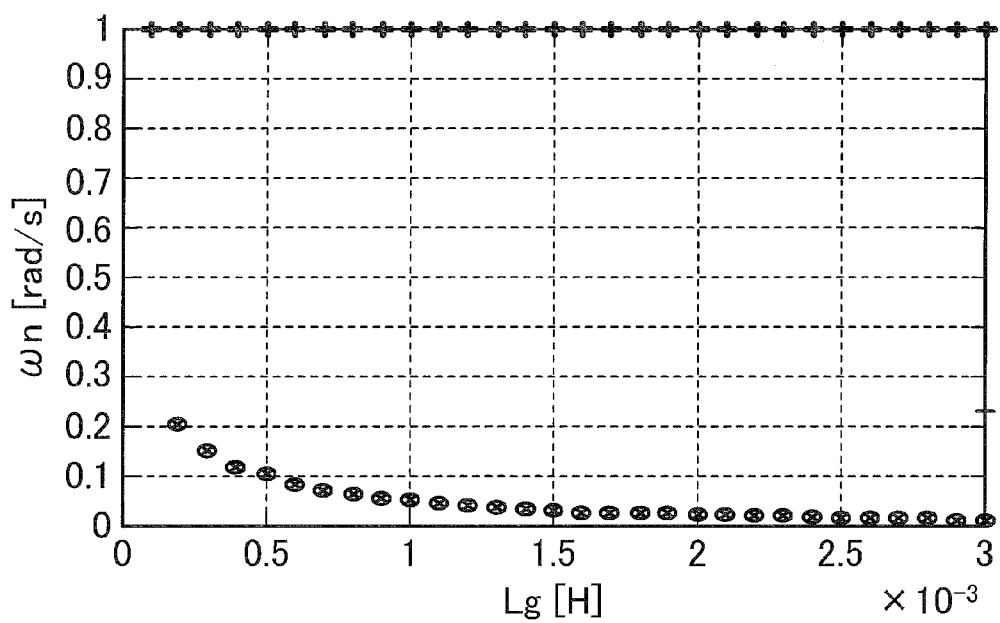
FIG. 5C is a graph illustrating how attenuation coefficient changes relative to increases in the impedance on the power source side.

FIGS. 5A to 5C are graphs illustrating how the pole, resonance angular velocity, and attenuation coefficient change relative to increases in impedance between the AC power source 2 and the power conversion apparatus 1 (hereinafter referred to as power source side impedance) in a simulation based on Formula (16).

As illustrated in FIG. 5A, when the power source side impedance is increased, the pole moves to the right and becomes unstable. As illustrated in FIG. 5C, when the power source side impedance is increased, the attenuation coefficient is decreased, making it difficult for attenuation to develop. This resonance suppression effect is attributed to the resistors Rr, Rs, and Rt, which are damping resistors.

Next, description will be made with regard to a method for obtaining a resonance suppression effect without using the resistors Rr, Rs, and Rt. As in the following Formula (17), assume that an item "A" is added to the capacitor voltage $V_{c\_rst}$ in the three phase state equation represented by Formula (13). Thus, the three phase state equation has an item to make the capacitor voltage $V_{c\_rst}$ converge with respect to change in the capacitor voltage $V_{c\_rst}$ $$\frac{d}{dt}\begin{bmatrix} I_{grid\_rst} \\ V_{L\_rst} \\ V_{C\_rst} \end{bmatrix} = \begin{bmatrix} -AI_{33} & -L_g^{-1}I_{33} & -L_g^{-1}I_{33} \\ O_{33} & -R(L^{-1}+L_g^{-1})I_{33} & -RL_g^{-1}I_{33} \\ C^{-1}I_{33} & O_{33} & -AI_{33} \end{bmatrix} \qquad (17)$$

$$\begin{bmatrix} I_{grid\_rst} \\ V_{L\_rst} \\ V_{C\_rst} \end{bmatrix} + \begin{bmatrix} L_g^{-1}I_{33} & O_{33} \\ RL_g^{-1}I_{33} & O_{33} \\ O_{33} & -C^{-1}I_{33} \end{bmatrix} \begin{bmatrix} V_{grid\_rst} \\ I_{O\_rst} \end{bmatrix}$$

From Formula (17), the capacitor voltage $V_{c\_rst}$ can be represented by the following Formula (18), where $A^* = C \times A$.

$$\frac{d}{dt}V_{C\_rst} = C^{-1}(I_{grid\_rst} - I_{o\_rst} - A^*V_{C\_rst}) \qquad (18)$$

Figure 6A:
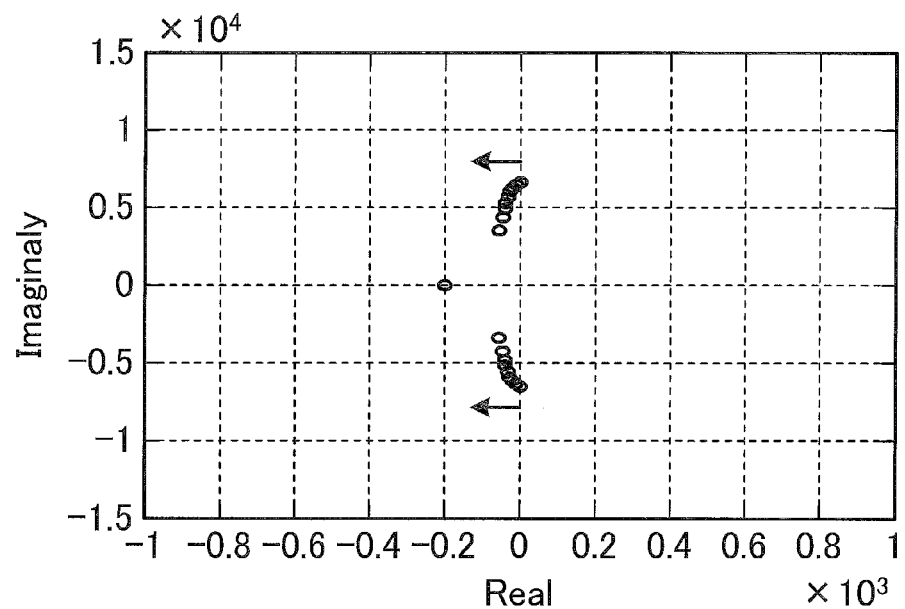
FIG. 6A is a graph illustrating how the pole changes relative to increases in the impedance on the power source side.
Figure 6B:
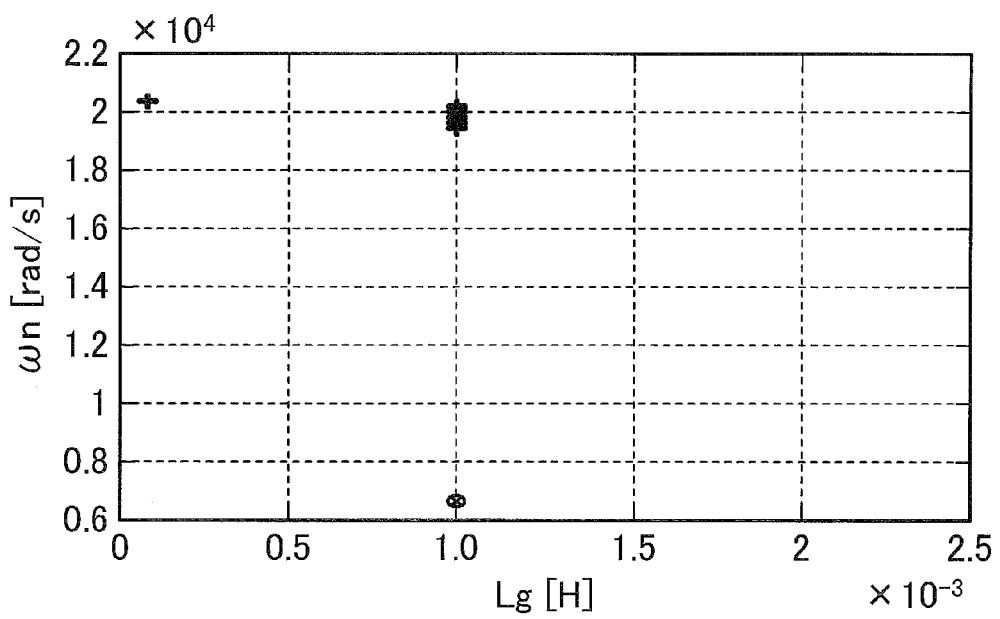
FIG. 6B is a graph illustrating how the resonance angular velocity changes relative to changes in A* with the impedance on the power source side constant.
Figure 6C:
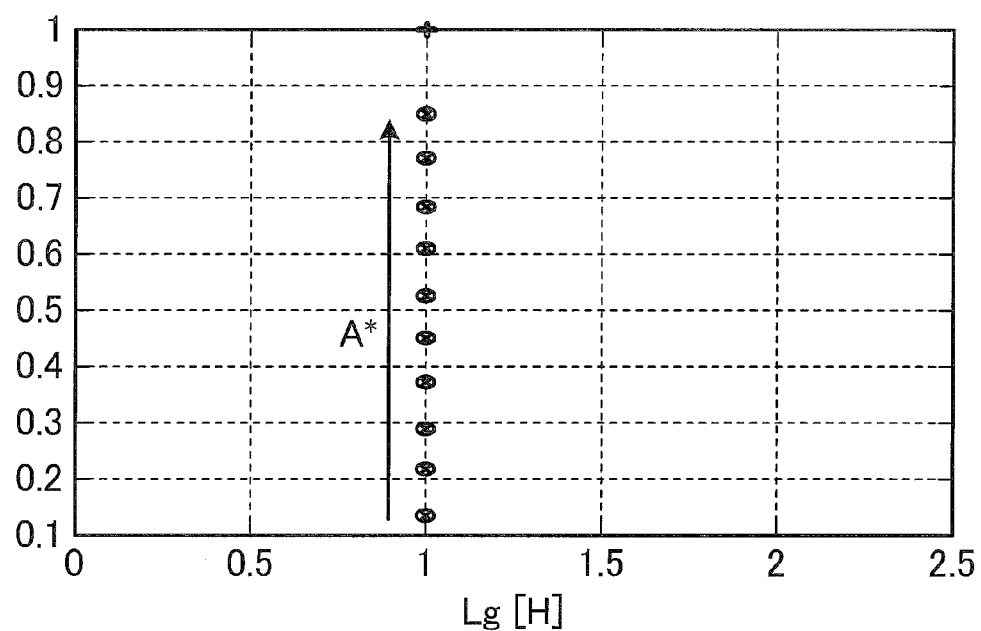
FIG. 6C is a graph illustrating how the attenuation coefficient changes relative to changes in A* with the impedance on the power source side constant.

Assume "$A^*V_{c\_rst}$" in Formula (18) to be $A^*=1/R$. This state is identical to a state in which the resistors are coupled in parallel with the capacitors Crs, Cst, and Ctr of the LC filter 11. FIGS. 6A to 6C are graphs illustrating results of a simulation with the resonance suppression item added. FIG. 6A illustrates how the pole changes relative to increases in the power source side impedance. FIG. 6B illustrates how the resonance angular velocity changes relative to changes in $A^*$ with the power source side impedance constant. FIG. 6C illustrates how the attenuation coefficient changes relative to changes in $A^*$ with the power source side impedance constant.

As illustrated in FIG. 6A, when the power source side impedance is increased, the pole moves to the left and becomes stable. As illustrated in FIG. 6C, when $A^*$ is increased, the attenuation coefficient is increased, and this facilitates attenuation. Thus, as seen in Formula (17), adding the item "A" provides a resonance suppression effect. Additionally, as compared with the case of the resistors Rr, Rs, and Rt, which are damping resistors, the resonance suppression effect increases the power source side impedance becomes larger.

Formula (18) can be represented by the following Formula (19). Thus, when the capacitor voltage $V_{c\_rst}$ is multiplied by "A*", and the product is added to the input current command $I_{O\_rst}*$, the resonance suppression effect is obtained.

$$\frac{d}{dt} V_{C\_rst} = C^{-1}\{I_{grid\_rst} - (I_{o\_rst} + A^* V_{C\_rst})\} \qquad (19)$$

When an oscillation component occurs in the capacitor voltage $V_{c\_rst}$ due to a resonance, an oscillation component also occurs in the capacitor current $I_{C\_rst}$. In view of this, the inventors performed a simulation of adding an oscillation component $\Delta I_C$ of the capacitor current $I_{C\_rst}$ to the input current command $I_{O\_rst}*$. As a result of the simulation, the inventors have found that a resonance suppression effect is obtainable similarly to the case of adding the item "A".

A possible reason for the resonance suppression effect is that by adding the oscillation component $\Delta I_C$ of the capacitor current $I_{C\_rst}$ to the input current command $I_{O\_rst}*$, the input current $I_{O\_rst}$ flows to cancel the oscillation component $\Delta I_C$ of the capacitor current $I_{C\_rst}$.

The controller 20 of the power conversion apparatus 1 according to the first embodiment controls the power converter 10 based on a new input current command $I'_{O\_rst}*$, which is the sum of the oscillation component $\Delta I_C$ of the capacitor current $I_{C\_rst}$ and the input current command $I_{O\_rst}*$. Thus, the phase of the input current $I_{O\_rst}$ of the power converter 10 changes in accordance with the oscillation component $\Delta I_C$, thereby reducing the oscillation component $\Delta I_C$. Even if the power source side impedance is so large that the resonance suppression effect realized by the resistors Rr, Rs, and Rt is insufficient, resonance on the LC filter 11 is eliminated or minimized. A configuration of the controller 20 will now be described in detail below. It should be noted that although providing the resistors Rr, Rs, and Rt enhances the resonance suppression effect, the resistors Rr, Rs, and Rt may not necessarily be provided.

1.3. Configuration of Controller 20

Figure 7:
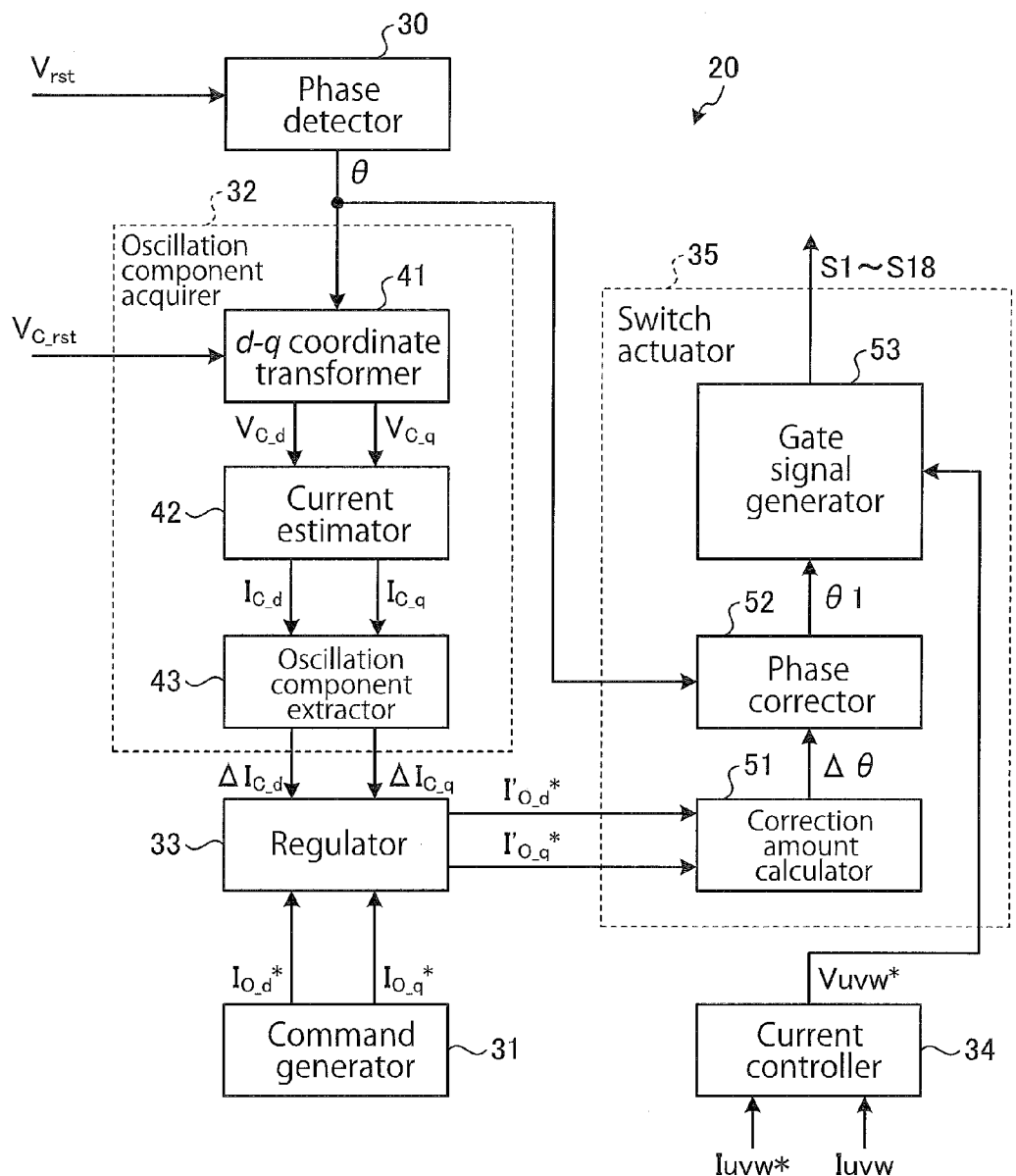
FIG. 7 is a diagram illustrating an exemplary configuration of a controller.

FIG. 7 is a diagram illustrating an exemplary configuration of the controller 20. In the configuration illustrated in FIG. 7, the controller 20 subjects the three phases to d-q coordinate transformation to perform arithmetic processing. The d-q coordinate system is a rectangular two axis coordinate system that rotates in accordance with an input voltage phase θ.

As illustrated in FIG. 7, the controller 20 includes a phase detector 30, the command generator 31, the oscillation component acquirer 32, the regulator 33, a current controller 34, and the switch actuator 35.

The phase detector 30 transforms, for example, an input voltage $V_{rst}$ into α/β components of two orthogonal axes on a stationary coordinate system so as to obtain a voltage value Vα in the α axis direction and a voltage value Vβ in the β axis direction. The phase detector 30 calculates the phase of the d-q axis rectangular coordinate system in such an exemplary manner that when the voltage values Vα and Vβ are transformed into d-q components of the d-q axis rectangular coordinate system, the d axis component is zero. The phase detector 30 outputs the calculated phase of the d-q axis rectangular coordinate system as the input voltage phase θ.

The command generator 31 generates an input current command $I_{O\_rst}*$, which is a command of the input current of the power converter 10. The input current command $I_{O\_rst}*$ includes a d axis input current command $I_{O\_d}*$ and a q axis input current command $I_{O\_q}*$. The input current commands $I_{O\_d}*$ and $I_{O\_q}*$ are results of d-q coordinate transformation of the current commands $I_{O\_r}*$, $I_{O\_s}*$ and $I_{O\_t}*$ respectively of the R phase, the S phase, and the T phase.

The oscillation component acquirer 32 acquires the oscillation component $\Delta I_C$ of the current flowing through the capacitors Crs, Cst, and Ctr of the LC filter 11. The oscillation component acquirer 32 includes a d-q coordinate transformer 41, a current estimator 42, and an oscillation component extractor 43.

The d-q coordinate transformer 41 transforms the capacitor voltage $V_{c\_rst}$ into αβ components of two orthogonal axes on a stationary coordinate system. Then, based on the input voltage phase θ, the d-q coordinate transformer 41 transforms the αβ components into d-q components of two orthogonal axes that rotate in accordance with the input voltage phase θ. Thus, the capacitor voltage $V_{c\_rst}$ is converted into a d axis capacitor voltage $V_{C\_d}$ and a q axis capacitor voltage $V_{C\_q}$.

Based on the d axis capacitor voltage $V_{C\_d}$ and the q axis capacitor voltage $V_{C\_q}$, the current estimator 42 estimates a d axis capacitor current $I_{C\_d}$ and a q axis capacitor current $I_{C\_q}$, which are d-q axis components of the capacitor current $I_{C\_rst}$. An example of the current estimator 42 is an observer to estimate the capacitor currents $I_{C\_d}$ and $I_{C\_q}$ from the capacitor voltages $V_{C\_d}$ and $V_{C\_q}$.

The d-q coordinate transformation of Formula (13) can be represented by the following Formula (20).

$$\frac{d}{dt}\begin{bmatrix} I_{grid\_dq} \\ V_{L\_dq} \\ V_{C\_dq} \end{bmatrix} = \begin{bmatrix} -\omega J_{22} & -L_g^{-1}I_{22} & -L_g^{-1}I_{22} \\ O_{33} & -R(L^{-1}+L_g^{-1})I_{22}-\omega J_{22} & -RL_g^{-1}I_{22} \\ C^{-1}I_{33} & O_{33} & -\omega J_{22} \end{bmatrix} \qquad (20)$$

$$+ \begin{bmatrix} L_g^{-1}I_{22} & O_{22} \\ RL_g^{-1}I_{22} & O_{22} \\ O_{22} & -C^{-1}I_{22} \end{bmatrix} \begin{bmatrix} V_{grid\_dq} \\ I_{O\_dq} \end{bmatrix}$$

Figure 8:
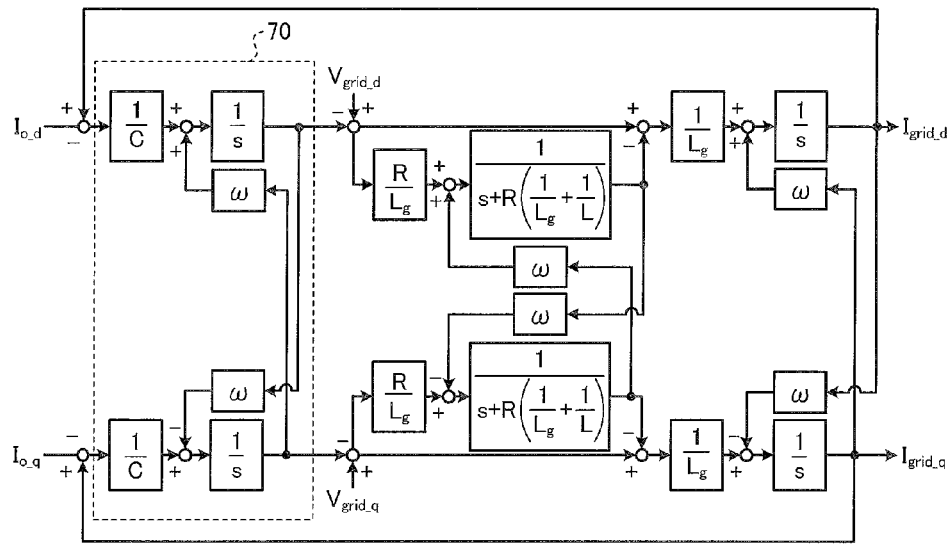
FIG. 8 is a block diagram corresponding to Formula (20)

FIG. 8 illustrates Formula (20) in a block diagram. In FIG. 8, a model 70 of the capacitors Crs, Cst, and Ctr (hereinafter referred to as capacitor model 70) is surrounded by a dotted line. The d-q axis components of the capacitor current $I_{C\_rst}$ are the input of the capacitor model 70, and the d-q axis components of the capacitor voltage $V_{c\_rst}$ are the output of the capacitor model 70. The current estimator 42 uses the capacitor model 70 to estimate the capacitor current $I_{C\_rst}$ from the capacitor voltage $V_{c\_rst}$.

Figure 9:
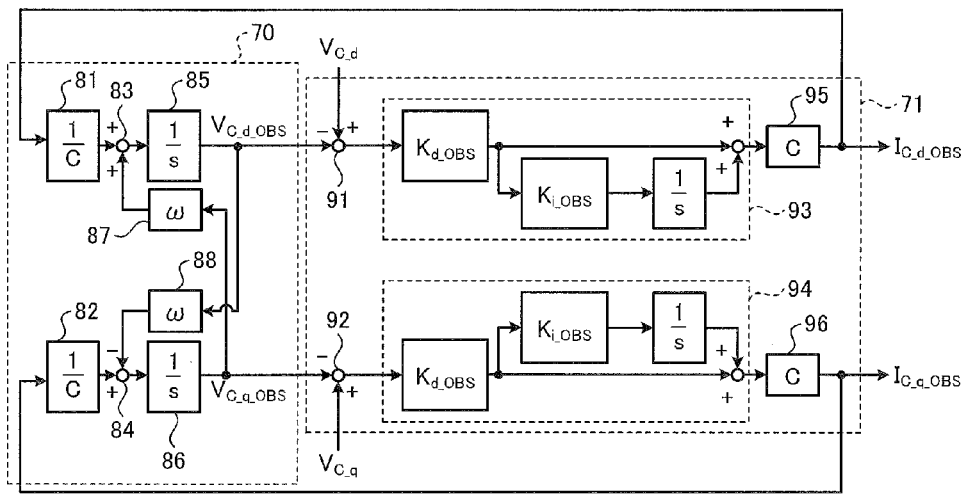
FIG. 9 is a diagram illustrating an exemplary configuration of a current estimator.

FIG. 9 is a block diagram illustrating a configuration of the current estimator 42. As illustrated in FIG. 9, the current estimator 42 includes the capacitor model 70 and a compensator 71. The capacitor model 70 includes amplifiers 81, 82, 87, and 88, adders 83 and 84, and integrators 85 and 86.

The amplifier 81 multiplies a d axis capacitor estimation current $I_{C\_d\_OBS}$ by 1/C, and outputs the product of the d axis capacitor estimation current $I_{C\_d\_OBS}$ and 1/C. The adder 83 adds an output of the amplifier 81 to the output of the amplifier 87. The integrator 85 integrates the output of the adder 83 to generate a d axis capacitor estimation voltage $V_{C\_d\_OBS}$. The amplifier 87 multiplies the output of the integrator 85 by an angular velocity ω(=2πfo), and outputs the product of the output of the integrator 85 and the angular velocity ω. Note that fo is the frequency of the AC power source 2.

The amplifier 82 multiplies a q axis capacitor estimation current $I_{C\_q\_OBS}$ by 1/C, and outputs the product of the q axis capacitor estimation current $I_{C\_q\_OBS}$ and 1/C. The adder 84 adds the output of the amplifier 82 to the output of the amplifier 88. The integrator 86 integrates the output of the adder 84 to generate a q axis capacitor estimation voltage $V_{C\_q\_OBS}$. The amplifier 88 multiplies the output of the integrator 86 by the angular velocity ω, and outputs the product of the output of the integrator 86 and the angular velocity ω.

The compensator 71 includes subtractors 91 and 92, proportional integral (PI) controllers 93 and 94, and amplifiers 95 and 96. The subtractor 91 calculates a deviation between the d axis capacitor voltage $V_{C\_d}$ and the d axis capacitor estimation voltage $V_{C\_d\_OBS}$. The PI controller 93 regulates the d axis capacitor estimation current $I_{C\_d\_OBS}$ output from the amplifier 95 to make the deviation zero between the d axis capacitor voltage $V_{C\_d}$ and the d axis capacitor estimation voltage $V_{C\_d\_OBS}$. The amplifier 95 multiplies the output of the PI controller 93 by a capacitance value "C" of the capacitors Crs, Cst, and Ctr to generate the d axis capacitor estimation current $I_{C\_d\_OBS}$.

The subtractor 92 calculates a deviation between the q axis capacitor voltage $V_{C\_q}$ and the q axis capacitor estimation voltage $V_{C\_q\_OBS}$. The PI controller 94 regulates the q axis capacitor estimation current $I_{C\_q\_OBS}$ output from the amplifier 96 to make the deviation zero between the q axis capacitor voltage $V_{C\_q}$ and the q axis capacitor estimation voltage $V_{C\_q\_OBS}$. The amplifier 96 multiplies the output of the PI controller 94 by the capacitance value "C" to generate the q axis capacitor estimation current $I_{C\_q\_OBS}$.

Thus, the current estimator 42 calculates the capacitor estimation currents $I_{C\_d\_OBS}$ and $I_{C\_q\_OBS}$ from the capacitor voltages $V_{C\_d}$ and $V_{C\_q}$. It should be noted that the configuration illustrated in FIG. 9 is an example of the current estimator 42. The current estimator 42 may have a configuration different from the configuration illustrated in FIG. 9 insofar as the capacitor estimation currents $I_{C\_d\_OBS}$ and $I_{C\_q\_OBS}$ are calculated from the capacitor voltages $V_{C\_d}$ and $V_{C\_q}$.

Referring back to FIG. 7, the controller 20 will be further described. The oscillation component acquirer 32 extracts a d axis oscillation component $\Delta I_{C\_d\_OBS}$ from the d axis capacitor estimation current $I_{C\_d\_OBS}$, and extracts a q axis oscillation component $\Delta I_{C\_q\_OBS}$ from the q axis capacitor estimation current $I_{C\_q\_OBS}$. The oscillation components $\Delta_{C\_d\_OBS}$ and $\Delta I_{C\_q\_OBS}$ contain a resonance frequency component of the LC filter 11.

Figure 10:
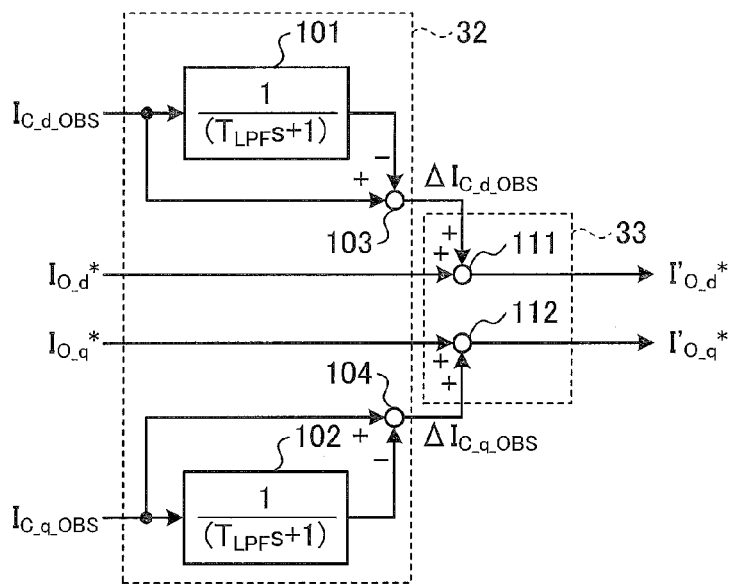
FIG. 10 is a diagram illustrating an exemplary configuration of an oscillation component acquirer.

FIG. 10 is a diagram illustrating an exemplary configuration of the oscillation component acquirer 32. As illustrated in FIG. 10, the oscillation component acquirer 32 includes low-pass filters 101 and 102 and subtractors 103 and 104. It should be noted that the oscillation component acquirer 32 will not be limited to the configuration illustrated in FIG. 10. Another possible example of the oscillation component acquirer 32 is an n-th order band-pass filter ("n" is a natural number) through which a signal of a resonance frequency band of the LC filter 11 is passed.

The low-pass filter 101 removes a resonance frequency band of the LC filter 11 that is higher than a fundamental wave component of the d axis capacitor estimation current $I_{C\_d\_OBS}$. The subtractor 103 removes the fundamental wave component of the d axis capacitor estimation current $I_{C\_d\_OBS}$ from the d axis capacitor estimation current $I_{C\_d\_OBS}$ to extract the d axis oscillation component $\Delta I_{C\_d\_OBS}$.

The low-pass filter 102 removes a resonance frequency band of the LC filter 11 that is higher than a fundamental wave component of the q axis capacitor estimation current $I_{C\_q\_OBS}$. The subtractor 104 removes the fundamental wave component of the q axis capacitor estimation current $I_{C\_q\_OBS}$ from the q axis capacitor estimation current $I_{C\_q\_OBS}$ to extract the q axis oscillation component $\Delta I_{C\_q\_OBS}$.

Referring back to FIG. 7, the controller 20 will be further described. Based on the d axis oscillation component $\Delta I_{C\_d\_OBS}$ and the q axis oscillation component $\Delta I_{C\_q\_OBS}$, the regulator 33 regulates the d axis input current command $I_{O\_d}^*$ and the q axis input current command $I_{O\_q}^*$ output from the command generator 31 to generate a d axis input current command $I'_{O\_d}^*$ and a q axis input current command $I'_{O\_q}^*$.

Specifically, as illustrated in FIG. 10, the regulator 33 includes adders 111 and 112. The adder 111 adds a d axis oscillation component $\Delta I_{C\_d\_OBS}$ to the d axis input current command $I_{O\_d}^*$ to generate the d axis input current command to $I'_{O\_d}^*$. The adder 112 adds a q axis oscillation component $\Delta I_{C\_q\_OBS}$ to the q axis input current command $I_{O\_q}^*$ to generate the q axis input current command $I'_{O\_q}^*$.

Thus, based on the oscillation components $\Delta I_{C\_d\_OBS}$ and $\Delta I_{C\_q\_OBS}$ of the capacitor current $I_{C\_rst}$ acquired by the oscillation component acquirer 32, the regulator 33 regulates the input current commands $I_{O\_d}^*$ and $I_{O\_q}^*$ to generate the input current commands $I'_{O\_d}^*$ and $I'_{O\_q}^*$.

Referring back to FIG. 7, the controller 20 will be further described. The current controller 34 generates an output voltage command $V_{uvw}^*$ to make an output current command $I_{uvw}^*$ match the output current $I_{uvw}$. The output current command $I_{uvw}^*$ includes, for example, output phase current commands $I_u^*$, $I_v^*$, and $I_w^*$, which are respectively commands of the currents of the U phase, the V phase, and the W phase. The output voltage command $V_{uvw}^*$ includes, for example, output phase voltage commands $V_u^*$, $V_v^*$, and $V_w^*$, which are respectively commands of the voltages of the U phase, the V phase, and the W phase.

The switch actuator 35 generates gate signals S1 to S18 based on the input current commands $I'_{O\_d}^*$ and $I'_{O\_q}^*$. As illustrated in FIG. 7, the switch actuator 35 includes a correction amount calculator 51, a phase determinator 52, and a gate signal generator 53.

The correction amount calculator 51 calculates a phase correction amount Δθ based on the input current commands $I'_{O\_d}^*$ and $I'_{O\_q}^*$. The correction amount calculator 51 calculates, for example, $\tan^{-1}(I'_{O\_d}^*/I'_{O\_q}^*)$ to obtain the phase correction amount $\Delta\theta (=\tan^{-1}(I'_{O\_d}^*/I'_{O\_q}^*))$.

The phase determinator 52 determines the phase of the input current $I_{O\_rst}$ based on the input voltage phase θ and the phase correction amount Δθ. Specifically, the phase determinator 52 adds the phase correction amount Δθ to the input voltage phase θ so as to calculate an input current phase θ1 (=θ+Δθ). It should be noted that the input current phase θ1 is an input current command with respect to the phase of the input current $I_{O\_rst}$.

The gate signal generator 53 generates the gate signals S1 to S18 based on the input current phase θ1, the input voltage $V_{rst}$, and the output phase voltage commands $V_u^* V_v^*$, and $V_w^*$. By the gate signals S1 to S18, the phase of the input current $I_{O\_rst}$ is regulated to match the input current phase θ1. At the same time, the bidirectional switch Sw of the power converter 10 is regulated to make the output phase voltage commands $V_u^*$, $V_v^*$, and $V_w^*$ match the output phase voltages $V_u$, $V_v$, and $V_w$.

For example, during a period of unchanging relationship in magnitude among the input phase voltages $V_r$, $V_s$, and $V_t$, the gate signal generator 53 makes the input phase voltages $V_r$, $V_s$, and $V_t$ into input phase voltages $E_p$, $E_m$, $E_n$ in descending order of magnitude. The gate signal generator 53 includes, for example, a table for calculating an input current distribution ratio α from the input current phase θ1.

The input current distribution ratio α is a distribution ratio of the input current $I_{O\_rst}$ in the power converter 10. For example, the input current distribution ratio α specifies a connection time period T1 with respect to the input phase voltage $E_p$ and a connection time period T2 with respect to the input phase voltage $E_m$. The input current distribution ratio α can be represented by, for example, α=T2/T1.

The gate signal generator 53 regulates the amplitude of a carrier wave signal based on states of the input current distribution ratio α and the input phase voltages $V_r$, $V_s$, and $V_t$ so as to generate a modulated wave signal that is based on the input current distribution ratio α and the output phase voltages $V_u$, $V_v$, and $V_w$. The gate signal generator 53 compares the carrier wave signal with the modulated wave signal to generate a PWM signal. The gate signal generator 53 subjects the PWM signal to, for example, commutation processing to generate the gate signals S1 to S18.

The controller 20 is implemented by a microcomputer including, for example, a central processing unit (CPU), a read only memory (ROM), a random access memory (RAM), and input/output ports, or an integrated circuit such as an application specific integrated circuit (ASIC) and a field programmable gate array (FPGA).

The CPU of the microcomputer reads and executes a program stored in the ROM to perform part or all of the functions of the phase detector 30, the command generator 31, the oscillation component acquirer 32, the regulator 33, the current controller 34, and the switch actuator 35. Alternatively, the ASIC, FPGA, or a similar circuit is capable of performing part or all of the functions of the phase detector 30, the command generator 31, the oscillation component acquirer 32, the regulator 33, the current controller 34, and the switch actuator 35.

Figure 11:
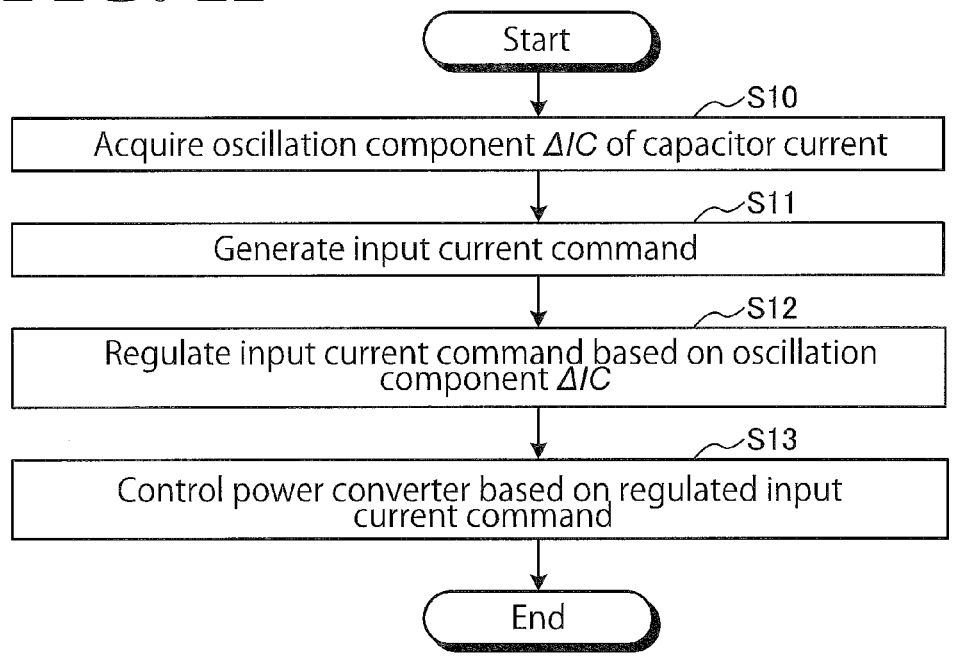
FIG. 11 is an exemplary flowchart of a flow of resonance suppression processing performed by the controller.

FIG. 11 is an exemplary flowchart of a flow of resonance suppression processing performed by the controller 20. As illustrated in FIG. 11, the controller 20 acquires an oscillation component $\Delta I_C$ of the capacitor current $I_{C\_rst}$ (step S10), and generates an input current command $I_{O\_rst}$ (step S11).

The controller 20 regulates the input current command $I_{O\_rst}^*$ based on the oscillation component $\Delta I_C$ of the capacitor current $I_{C\_rst}$ (step S12). Based on the regulated input current command $I_{O\_rst}^*$, the controller 20 controls the power converter 10 (step S13). Thus, for example, even when the power source side impedance is large, the power conversion apparatus 1 eliminates or minimizes resonance of the LC filter 11.

Figure 12:
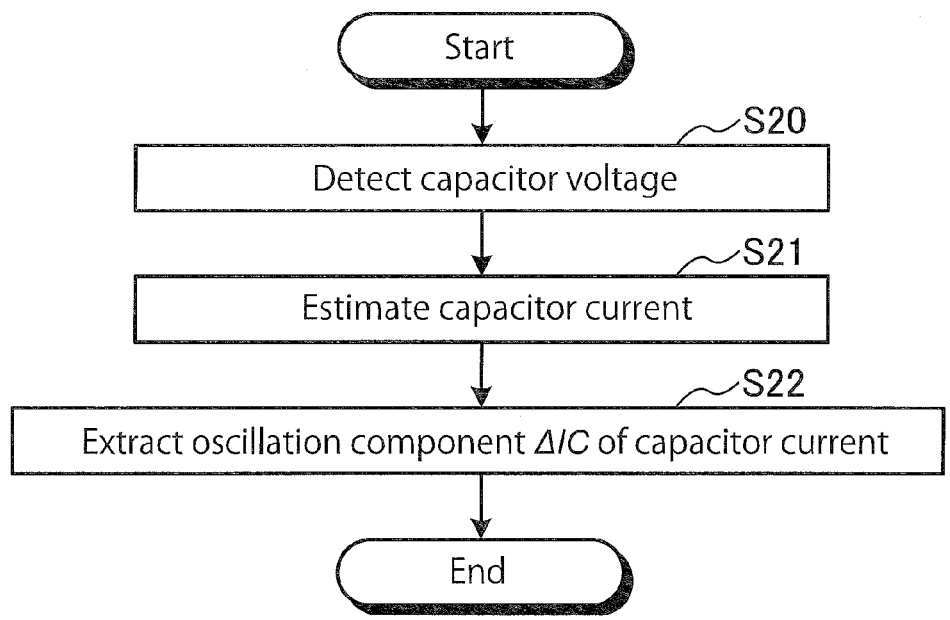
FIG. 12 is an exemplary flowchart of a flow of processing at step S10 illustrated in FIG. 11.

FIG. 12 is an exemplary flowchart of a flow of the processing at step S10 illustrated in FIG. 11. As illustrated in FIG. 12, the controller 20 detects a capacitor voltage $V_{c\_rst}$ output from the capacitor voltage detector 13 (step S20), and estimates the capacitor current $I_{C\_rst}$ based on the capacitor voltage $V_{c\_rst}$ (step S21). Then, the controller 20 extracts the oscillation component $\Delta I_C$ contained in the estimated capacitor current $I_{C\_rst}$ (step S22).

2. Second Embodiment

Next, a power conversion apparatus according to a second embodiment will be described. The power conversion apparatus according to the second embodiment is different from the power conversion apparatus 1 according to the first embodiment in that the power conversion apparatus according to the second embodiment performs improvement control of the input power factor. Except for the configuration for the improvement control of the input power factor, the power conversion apparatus according to the second embodiment is similar to the power conversion apparatus 1 according to the first embodiment. In view of this, the configuration common to the first embodiment and the second embodiment will not be elaborated here. Like reference numerals designate corresponding or identical elements throughout the first embodiment and the second embodiment, and these elements will not be elaborated here.

Figure 13:
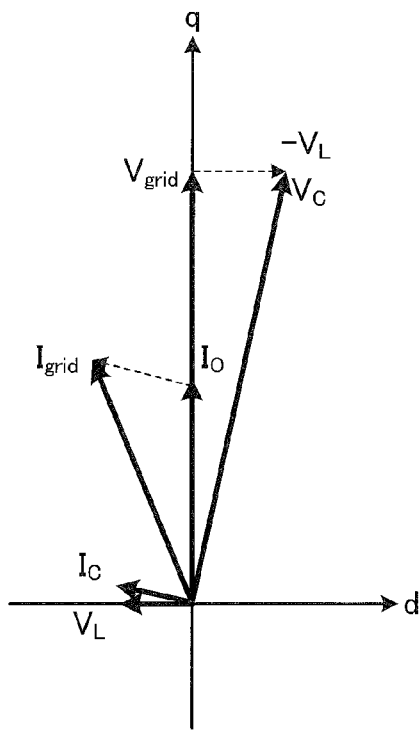
FIG. 13 is a graph illustrating a state of input power factor control performed by the power conversion apparatus according to the first embodiment.
Figure 14:
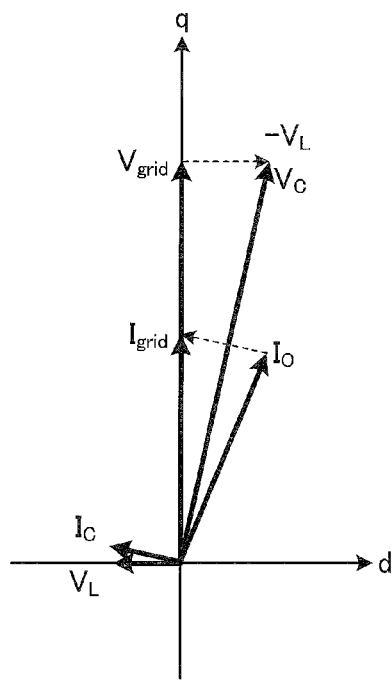
FIG. 14 is a graph illustrating a state of input power factor control performed by a power conversion apparatus according to a second embodiment.

FIG. 13 is a graph illustrating a state of input power factor control performed by the power conversion apparatus 1 according to the first embodiment. FIG. 14 is a graph illustrating a state of input power factor control performed by the power conversion apparatus according to the second embodiment.

The power conversion apparatus according to the second embodiment performs input-power-factor-1 control in consideration of an influence by the capacitors Crs, Cst, and Ctr of the LC filter 11. The output current $I_{grid}$ of the AC power source 2 (see FIG. 4) is an input current $I_O$ flowing to the power converter 10 (see FIG. 4) and a capacitor current $I_C$ flowing to the capacitors Crs, Cst, and Ctr (see FIG. 4).

Thus, when the input current $I_O$ is controlled to match the q axis in a d-q axis coordinate system, a phase deviation may occur between the output current $I_{grid}$ (see FIG. 4) and the output voltage $V_{grid}$ (see FIG. 4), as illustrated in FIG. 13. This may make it impossible to make the input power factor 1.

In view of this, the power conversion apparatus according to the second embodiment regulates the input current command $I_{O\_rst}^*$ in accordance with the capacitor current $I_{C\_rst}$ so as to shift the phase of the input current $I_O$ as illustrated in FIG. 14. This ensures a match between the phases of the output current $I_{grid}$ of the AC power source 2 and the output voltage $V_{grid}$ as illustrated in FIG. 14, making the input power factor 1.

Figure 15:
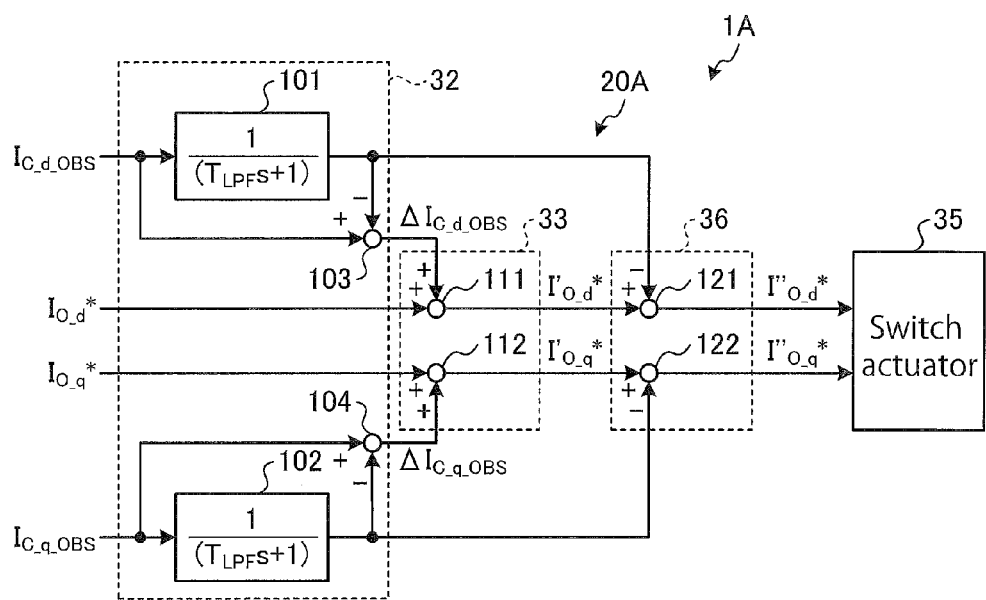
FIG. 15 is a diagram partly illustrating an exemplary configuration of a controller of the power conversion apparatus according to the second embodiment.

FIG. 15 is a diagram illustrating an exemplary configuration of a part of a controller 20A of a power conversion apparatus 1A according to the second embodiment. The command generator 31 and the current controller 34 respectively have similar configurations to their configurations in the controller 20, and thus are not elaborated in FIG. 15.

As illustrated in FIG. 15, the controller 20A includes a power factor controller 36. The power factor controller 36 regulates the input current commands $I'_{O\_d}^*$ and $I'_{O\_q}^*$ output from the regulator 33 so as to improve the input power factor.

The power factor controller 36 includes subtractors 121 and 122. The subtractor 121 subtracts an output of the low-pass filter 101 (which is an example of the current calculator) from an output of the adder 111. The subtractor 122 subtracts an output of the low-pass filter 102 (which is an example of the current calculator) from an output of the adder 112.

Specifically, the subtractor 121 subtracts a fundamental wave component of the d axis capacitor estimation current $I_{C\_d\_OBS}$ from the d axis input current command $I'_{O\_d}^*$ so as to generate a d axis input current command $I''_{O\_d}^*$. The subtractor 122 subtracts a fundamental wave component of the q axis capacitor estimation current $I_{C\_q\_OBS}$ from the q axis input current command $I'_{O\_q}^*$ so as to generates a q axis input current command $I''_{O\_q}^*$. It should be noted that the power factor controller 36 may include an additional low-pass filter to remove the oscillation components $\Delta I_{C\_d\_OBS}$ and $\Delta I_{C\_q\_OBS}$ from the capacitor estimation currents $I_{C\_d\_OBS}$ and $I_{C\_q\_OBS}$.

Based on the input current commands $I''_{O\_d}^*$ and $I''_{O\_q}^*$, the switch actuator 35 generates the gate signals S1 to S18.

For example, the switch actuator 35 calculates $\tan^{-1}$ ($I''_{O\_d}*/I''_{O\_q}*$) to obtain the phase correction amount $\Delta\theta$, and adds the input voltage phase $\theta$ to the phase correction amount $\Delta\theta$ so as to determine the input current phase $\theta 1$. Based on the input current phase $\theta 1$ and the output phase voltages $V_u$, $V_v$, and $V_w$, the switch actuator 35 generates the gate signals S1 to S18.

Thus, the power conversion apparatus 1A according to the second embodiment delays the input current phase $\theta 1$ by a phase amount in accordance with a leading current by the capacitors Crs, Cst, and Ctr of the LC filter 11. Thus, the power conversion apparatus 1A ensures a match between the phases of the output current $I_{grid}$ and the output voltage $V_{grid}$ of the AC power source 2, and thus controls the input power factor at 1.

3. Third Embodiment

Next, a power conversion apparatus according to a third embodiment will be described. The power conversion apparatus according to the third embodiment is different from the power conversion apparatuses 1 and 1A according to the first and second embodiments in that the power conversion apparatus according to the third embodiment detects the capacitor current instead of estimating the capacitor current. Except for the configuration for detecting the capacitor current and extracting an oscillation component from the capacitor current, the power conversion apparatus according to the third embodiment is similar to the power conversion apparatuses 1 and 1A according to the first and second embodiments. In view of this, the configuration common to the first to third embodiments will not be elaborated here. For example, the input voltage detector 12, the capacitor voltage detector 13, the output current detector 14, the command generator 31, the current controller 34, and the power factor controller 36 will not be elaborated here.

Figure 16:
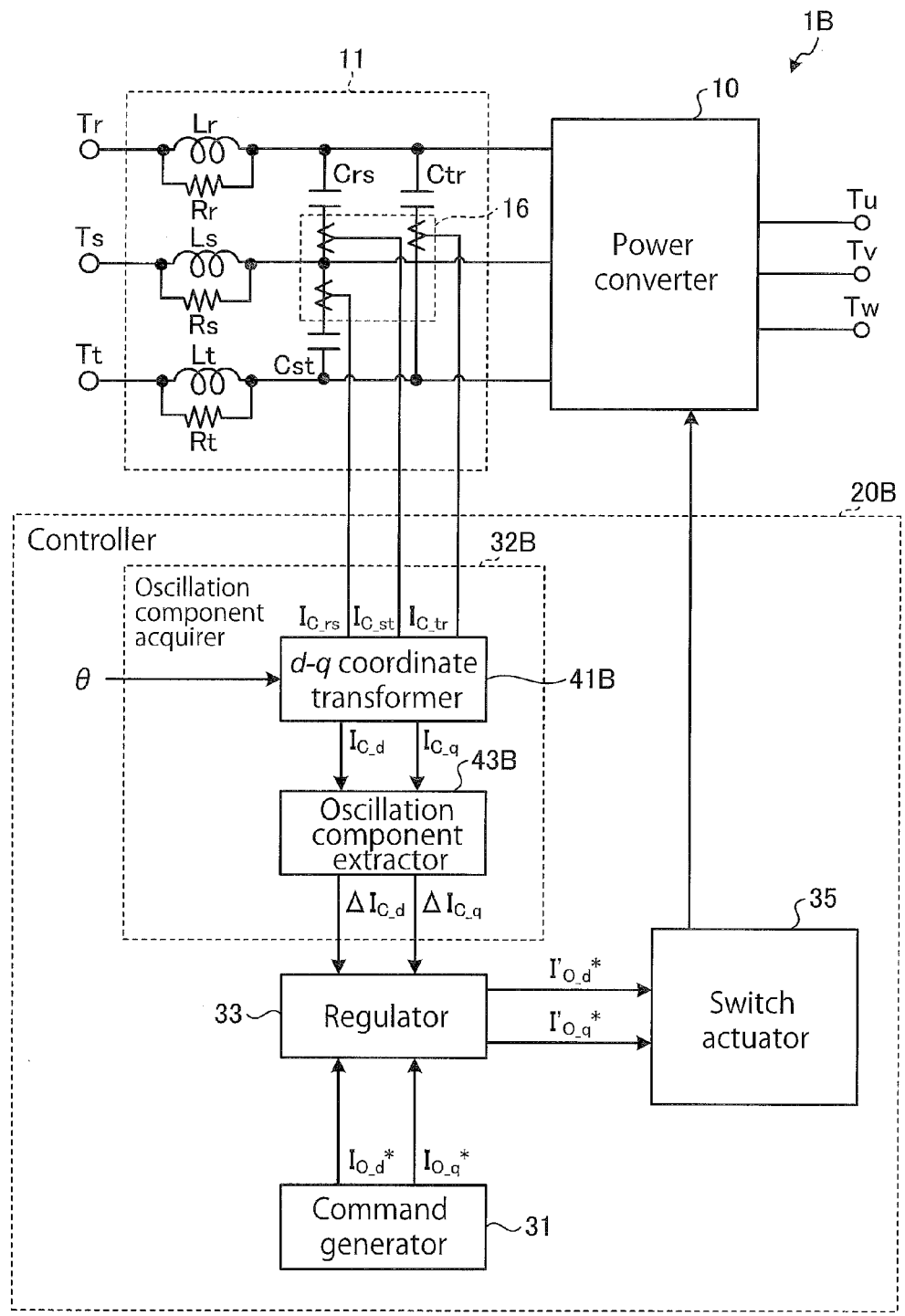
FIG. 16 is a diagram illustrating an exemplary configuration of a power conversion apparatus according to a third embodiment.

FIG. 16 is a diagram illustrating a configuration of the power conversion apparatus 1B according to the third embodiment. As illustrated in FIG. 16, the power conversion apparatus 1B includes the power converter 10, the LC filter 11, a capacitor current detector 16, and a controller 20B.

The capacitor current detector 16 detects the capacitor current $I_{C\_rst}$. Specifically, the capacitor current detector 16 detects the capacitor currents $I_{C\_rs}$, $I_{C\_st}$, $I_{C\_tr}$, which respectively flow through the capacitors Crs, Cst, and Ctr. It should be noted that the capacitor current detector 16 detects the currents using, for example, a Hall element, which is a magnetoelectric conversion device.

The controller 20B includes the command generator 31, an oscillation component acquirer 32B, the regulator 33, and the switch actuator 35. The oscillation component acquirer 32B includes a d-q coordinate transformer 41B and an oscillation component extractor 43B.

The d-q coordinate transformer 41B transforms the capacitor current $I_{C\_rst}$ into $\alpha\beta$ components of two orthogonal axes on a stationary coordinate system. Then, based on the input voltage phase $\theta$, the d-q coordinate transformer 41B transforms the $\alpha\beta$ components into d-q components of two orthogonal axes that rotate in accordance with the input voltage phase $\theta$. Thus, the capacitor current $I_{C\_rst}$ is converted into the d axis capacitor current $I_{C\_d}$ and the q axis capacitor current $I_{C\_q}$.

The oscillation component extractor 43B extracts a d axis oscillation component $\Delta I_{C\_d}$ from the d axis capacitor current $I_{C\_d}$, and extracts a q axis oscillation component $\Delta I_{C\_q}$ from the q axis capacitor current $I_{C\_q}$. The oscillation components $\Delta I_{C\_d}$ and $\Delta I_{C\_q}$ include a resonance frequency component of the LC filter 11. Similarly to the oscillation component acquirer 32, the oscillation component extractor 43B includes, for example, the low-pass filters 101 and 102, and the subtractors 103 and 104 (see FIG. 10). Another possible example of the oscillation component extractor 43B is an n-th order band-pass filter ("n" is a natural number) through which a resonance frequency component of the LC filter 11 is passed.

In this manner, the capacitor current detector 16 detects the capacitor currents $I_{C\_d}$ and $I_{C\_q}$, and the oscillation component acquirer 32B extracts the oscillation components $\Delta I_{C\_d}$ and $\Delta I_{C\_q}$ from the capacitor currents $I_{C\_d}$ and $I_{C\_q}$. Then, the regulator 33 uses the oscillation components $\Delta I_{C\_d}$ and $\Delta I_{C\_q}$ to regulate the input current commands $I_{O\_d}*$ and $I_{O\_q}*$ so as to generate the input current commands $I'_{O\_d}*$ and $I'_{O\_q}*$. Based on the input current commands $I'_{O\_d}*$ and $I'_{O\_q}*$, the controller 20B generates the gate signals S1 to S18 to eliminate or minimize resonance of the LC filter 11.

In place of the capacitor current detector 16, the power conversion apparatus 1B may include, for example, an input current detector to detect currents flowing into the power converter 10 respectively from the R phase, the S phase, and the T phase of the AC power source 2. In this case, for example, the controller 20B transforms the input phase currents $I_r$, $I_s$, and $I_t$ detected by the input current detector into d-q components, and extracts a signal of the resonance frequency band of the LC filter 11 from the d-q components. In this manner, the controller 20 may extract the d axis oscillation component $\Delta I_{C\_d}$ and the q axis oscillation component $\Delta I_{C\_q}$.

While in the first to third embodiments the power conversion apparatuses 1, 1A, and 1B regulate the input current commands by d-q coordinate transformation of the three phases, the d-q coordinate transformation may not necessarily be used in regulating the input current commands.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A power conversion apparatus comprising:
    a power converter disposed between an AC power source and a load;
    an LC filter disposed between the AC power source and the power converter; and
    a controller configured to control the power converter to perform power conversion control between the AC power source and the load, the controller comprising:
        a command generator configured to generate an input current command comprising a command of an input current of the power converter;
        an oscillation component acquirer configured to acquire an oscillation component of a current flowing through a capacitor of the LC filter;
        a regulator configured to regulate the input current command based on the oscillation component acquired by the oscillation component acquirer; and
        an actuator configured to control the power converter based on the input current command regulated by the regulator.

2. The power conversion apparatus according to claim 1, further comprising a voltage detector configured to detect a voltage of the capacitor,
    wherein the oscillation component acquirer comprises
        a current estimator configured to estimate the current flowing through the capacitor based on the voltage of the capacitor detected by the voltage detector, and
        an oscillation component extractor configured to extract an oscillation component from the current estimated by the current estimator.

3. The power conversion apparatus according to claim 2, further comprising:
- a phase detector configured to detect a voltage phase of the AC power source;
- a correction amount calculator configured to calculate a phase correction amount based on the input current command regulated by the regulator; and
- a phase determinator configured to determine a phase of the input current based on the phase correction amount calculated by the correction amount calculator and the voltage phase detected by the phase detector,
- wherein the actuator is configured to control the power converter to make the phase of the input current match the phase determined by the phase determinator.

4. The power conversion apparatus according to claim 3, further comprising a current calculator configured to subtract the oscillation component from the current estimated by the current estimator so as to calculate another current,
- wherein the phase determinator is configured to determine the phase of the input current based on the current calculated by the current calculator, based on the phase correction amount calculated by the correction amount calculator, and based on the voltage phase detected by the phase detector.

5. The power conversion apparatus according to claim 1, wherein the actuator is configured to control a phase of the input current based on the input current command regulated by the regulator.

6. The power conversion apparatus according to claim 1, wherein the actuator is configured to determine a distribution ratio of the input current of the power converter based on the input current command regulated by the regulator and configured to control the power converter based on the determined distribution ratio.

7. A control device for a power conversion apparatus, the control device comprising:
- an oscillation component acquirer configured to acquire an oscillation component of a current flowing through a capacitor of an LC filter disposed between a power converter and an AC power source, the power converter being configured to perform power conversion between the AC power source and a load;
- a command generator configured to generate an input current command comprising a command of an input current of the power converter;
- a regulator configured to regulate the input current command based on the oscillation component acquired by the oscillation component acquirer; and
- an actuator configured to control the power converter based on the input current command regulated by the regulator.

8. A method for controlling a power conversion apparatus, the method comprising:
- acquiring an oscillation component of a current flowing through a capacitor of an LC filter disposed between a power converter and an AC power source, the power converter being configured to perform power conversion between the AC power source and a load;
- generating an input current command comprising a command of an input current of the power converter;
- regulating the input current command based on the acquired oscillation component; and
- controlling the power converter based on the regulated input current command.

9. The method according to claim 8, further comprising detecting a voltage of the capacitor,
- wherein the oscillation component acquiring step comprises
  - estimating the current flowing through the capacitor based on the detected voltage of the capacitor, and
  - extracting an oscillation component from the estimated current.

10. A power conversion apparatus comprising:
- power converting means between an AC power source and a load;
- an LC filter disposed between the AC power source and the power converting means; and
- controlling means for controlling the power converting means to perform power conversion control between the AC power source and the load, the controlling means comprising:
  - command generating means for generating an input current command comprising a command of an input current of the power converting means;
  - oscillation component acquiring means for acquiring an oscillation component of a current flowing through a capacitor of the LC filter;
  - regulating means for regulating the input current command based on the oscillation component acquired by the oscillation component acquiring means; and
  - actuating means for controlling the power converting means based on the input current command regulated by the regulating means.

11. The power conversion apparatus according to claim 2, wherein the actuator is configured to control a phase of the input current based on the input current command regulated by the regulator.

12. The power conversion apparatus according to claim 2, wherein the actuator is configured to determine a distribution ratio of the input current of the power converter based on the input current command regulated by the regulator and configured to control the power converter based on the determined distribution ratio.

* * * * *